Oct. 6, 1964

D. J. TINDALL 3,151,347

REPLACEABLE FACING FOR ABRADING TOOLS
AND PROCESS OF MAKING SAME

Filed Nov. 9, 1962

INVENTOR.
Donald J. Tindall

BY Wilkinson, Mawhinney & Theibault
ATTORNEYS

Oct. 6, 1964  D. J. TINDALL  3,151,347
REPLACEABLE FACING FOR ABRADING TOOLS
AND PROCESS OF MAKING SAME
Filed Nov. 9, 1962  2 Sheets-Sheet 2

INVENTOR.
Donald J. Tindall
BY
Wilkinson, Mawhinney & Thiebault
ATTORNEYS

United States Patent Office 3,151,347
Patented Oct. 6, 1964

3,151,347
REPLACEABLE FACING FOR ABRADING TOOLS
AND PROCESS OF MAKING SAME
Donald J. Tindall, 36 E. Jackson St., Orlando, Fla.
Filed Nov. 9, 1962, Ser. No. 236,515
13 Claims. (Cl. 15—208)

The present invention relates to replaceable facing for abrading tools and process of making same, and relates more particularly to a facing of the general type and for the purposes as disclosed in United States Patent 2,886,-923, granted May 19, 1959, to Cyrille H. La France, entitled Lens Surfacing Techniques in which the facing or sheeting is of wire mesh.

An object of the invention is to provide a facing of a more durable material in a more durable form having superior characteristics for contouring more accurately to the curved, convex or other surfaces of the abrading tool.

Another object of the invention is to provide a replaceable protective abrading facing for a lens surfacing tool in which a superior abrading function is made possible by the novel form of the sheeting or facing and in the association of elements of the facing which causes the facing as a whole to move into a concave-convex form whenever the facing is subjected to pulling action at one or both sides thereof or when the facing is pressed against the curved surfaces of the tool.

The invention also has for an object the provision of a novel method of making the facing or sheeting and applying it to the tool surfaces.

With the foregoing and other objects in view, the invention will be more fully described hereinafter, and will be more particularly pointed out in the claims appended herein.

In the drawings, wherein like symbols refer to like or corresponding parts throughout the several views.

Figure 8:
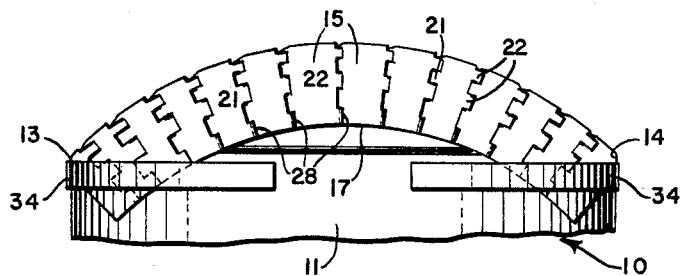
FIGURE 8 is a fragmentary side-elevational view of an abrading tool having the facing of the invention applied thereover and clamped thereto.
Figure 9:
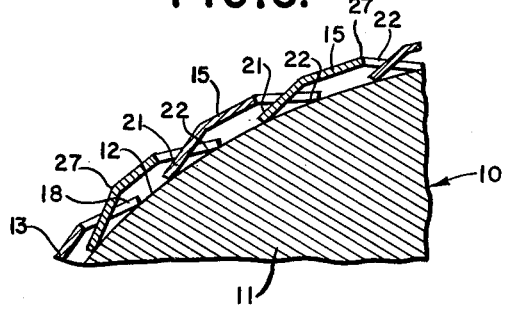
FIGURE 9 is a cross-sectional view taken through the abrading tool and the facing on an enlarged scale on the line 9—9 of FIGURE 7.

Referring more particularly to the drawings, in FIGURES 8 and 9, 10 designates a lens surfacing tool, ordinarily comprising a body portion 11 of cast iron or some similar material, having a curved surface 12 to which facings are applied.

Figure 1:
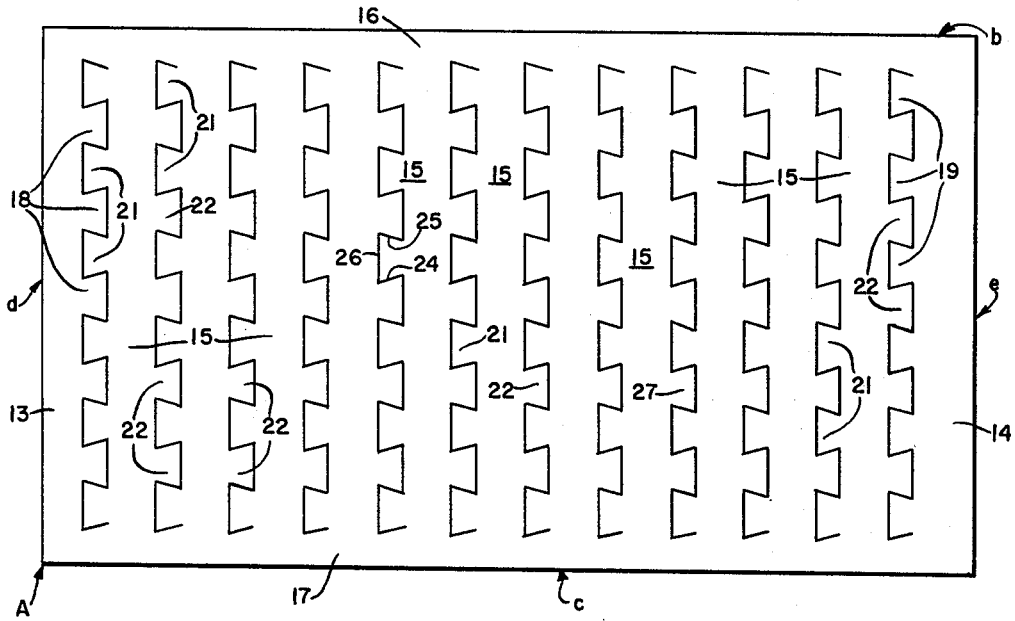
FIGURE 1 is a plan view of the upper face of a sheet of facing material showing a pattern stamped or otherwise produced thereon as a first step in the process for making a replaceable facing pursuant to the invention.
Figure 2:
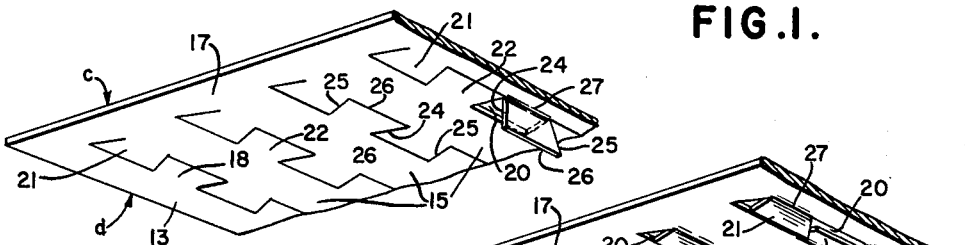
FIGURE 2 is a fragmentary perspective view of the sheet in the stamped condition of FIGURE 1, illustrating the lower face thereof.

The facing of the invention is made from a sheet A, as shown in FIGURE 1, of suitable material, preferably metal, for example, aluminum or copper, desirably in thin or foil form having ductile and/or malleable characteristics, by which the resultant facing may be readily molded to the curved surface 12 of the lens grinding or other abrading tool 10.

For convenience in description, the sheet A in FIGURE 1 comprises longitudinal or end edges $b$ and $c$, and side or lateral edges $d$ and $e$.

According to a preferred process, this sheet A is diestamped or otherwise incised or cut to produce the pattern illustrated in FIGURE 1, such pattern lying wholly within and spaced from both the end edges $b$ and $c$ and from the side or lateral edges $d$ and $e$.

This treatment of the sheet A divides the same into side strips 13 and 14 and an appropriate number of intermediate strips 15.

The strips 13, 14 and 15 are relatively narrow as compared with the width $d$–$e$ of the sheet A, and as to length, these strips run in a longitudinal direction with their end portions merging into marginal end bands 16 and 17 which are left intact after the stamping operation and run laterally of the sheet along and inwardly of the end or longitudinal edges $b$ and $c$. The opposite end portions of all of the strips 13, 14 and 15 are joined together by these end bands 16 and 17.

Projecting from opposite lateral edges of each strip 15 are a series of projections or tongues 21 and 22. The projections 21 at one side of the strip are spaced apart longitudinally of one another, and the projections 22 at the opposite lateral edge of each strip 15 are also spaced apart longitudinally. For convenience, the projections 21 and 22 are of the same dimensions, are edgewise abutting, and as revealed in FIGURE 3, remain in this abutting relationship after the projections are bent down and diagonally displaced below the plane of the sheet A.

Similarly, longitudinally spaced projections 18 on the side strip 13 are disposed at opposite sides of each projection 21 of the adjacent strip 15 and occupy the spaces between the projections 21.

The opposite side strip 14 carries projections 19 which are interleaved or intermeshed with the projections 22 of the adjacent strip 15.

Figure 3:
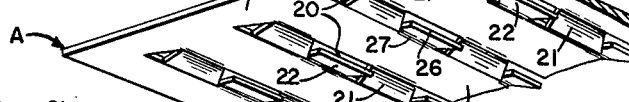
FIGURE 3 is a view similar to FIGURE 2 showing a second step in the process by which the intermeshing or interleaved tongues produced in the sheet from the original stamping are displaced downwardly from the plane of the sheet in relatively opposite diagonal positions.

As shown in FIGURE 3, the various projections 21, 22 and 18, 19 are depressed below the plane of the sheet A along flex hinge or crease hinge lines 27 to assume relatively opposite diagonal positions in which the adjoining projections are intermeshed, abutting at their side edges 24 and 25 and crossing one another.

Figure 4:
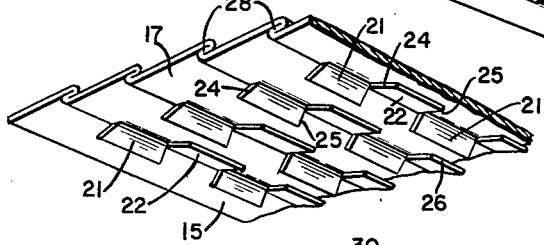
FIGURE 4 is also a fragmentary perspective view from the viewpoint of the underside or face of the sheet, illustrating a third step of the preferred process by which the longitudinal edge portions of the sheet are folded or crimped to shorten the lateral dimension of the sheet, causing underlapping of the tongues beneath adjacent strips of the sheet produced incidental to the stamping operation.

After being so depressed or displaced downwardly out of the plane of the sheet A, as shown in FIGURE 3, the strips 13, 14 and 15 are moved toward one another to cause these various projections to underlap the strips. This movement of the strips together will foreshorten the sheet A and this foreshortening and closer grouping of the various strips may be accomplished in various ways, for instance, as shown in FIGURE 4, by folding or crimping the bands 16 and 17 at points indicated at 28. These folds are only sufficient to cause a partial or complete lapping of the projections on the under face of the sheet.

With malleable or ductile metal in thin or foil form, this folding or crimping of the sheet at the marginal bands 16 and 17 will tend to hold the bands 16 and 17 together at opposite longitudinal edges of the sheet, but as the only connection between intermediate parts of the strips is by way of the intermeshed projections, the sheet will be free to expand and contract. In other words, the folded or crimped bands will exercise a certain restraint upon the opening movement of the strips. This opening movement will be greatest on the median lateral line of the sheet and will progressively diminish from such median line toward opposite bands 16 and 17 where any such opening movement will be totally or partially restrained by the folds or crimps 28, although an unfolding of the crimps 28 to a limited extent due to stresses encountered in shaping the facing to the curved surface of the tool may be permitted and becomes beneficial in a more accurate conforming of the facing to the curvature of the tool.

The projections 18, 19, 21 and 22 are preferably of dovetail or wedge form, having the opposite lateral extending edges 24 and 25 diverging outwardly from the strips so that the widest longitudinal sections of the projections are at the free outer ends of such projections and the areas of the projections diminish progressively in a longitudinal sense from the outer free edges toward the strips supporting the same, that is toward the hinge connections 27 of the projections with the strips. In other words, the narrowest dimensions of the projections 21, 22 are along the hinge lines 27. Consequently, when the sheet is in its most closely contracted condition with the complete underlapping of the tongues 21 and 22 and with the lines of the hinge joints 27 of the projections 21 and 22 at or close to alignment, the narrowest longitudinal dimensions of the projections 21 and 22 will be in such longitudinal alignment permitting free lateral edgewise movement of the flat flexible strips 13, 14 and 15 in lateral directions through an opening movement which is arrested only when the free end portions of the projections 21 and 22 arrive in longitudinal alignment. Thus, these intermeshing tongues in the diagonally displaced relative positions form lost-motion connections between adjacent strips, permitting of a limited relative lateral movement of the strips from the contracted to the maximum expanded condition. However, such lateral spreading movements of the strips relatively to one another will not open any interstices or spaces of any kind through the facing as in a wire mesh structure, as the projections 18, 19, 21 and 22 will at all times cover any gaps between the strips incident to the movement of the strips apart, it being understood that the projections are continuous from one end b to the other end c of the sheet A, as indicated in FIGURE 1. The projections form limit stops for the spreading movement of the strips and also cover the gaps that would otherwise be presented to the outer side of the facing which is presented to the lens.

Figure 5:
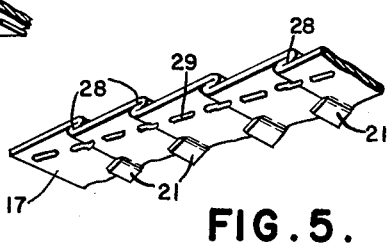
FIGURE 5 is a fragmentary perspective view similar to FIGURE 4, but with the addition of stitching tending to reinforce and retain with flexibility the folds or crimps.

Referring more particularly to FIGURE 5, the crimps or corrugations 28 may be reinforced by stitching 29 made through the bands 16 and 17 to retain the corrugations in place to prevent any material expansion or stretching of the bands 16 and 17. Where some relaxing of the folds 28 is desired, the stitching can be loose or elastic.

Figure 6:
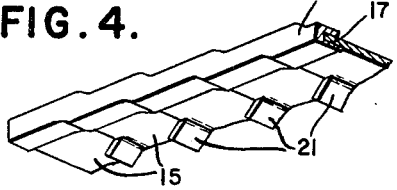
FIGURE 6 is a view similar to FIGURES 4 and 5, but illustrating adhesive tape in place of the stitches to retain within limits the overlapped or crimped condition of the sheet longitudinal edges.

Referring more particularly to FIGURE 6, instead of the stitches, the bands 16 and 17 may be held in the folded or crimped condition by the application of tape 30 in a U-shape or other form, such tape having some elasticity if desired.

Where the end portions of the strips 13, 14 and 15 are cut completely through the longitudinal edges b and c of the sheet, such end portions may be held together in an overlapped or other condition by the tape 30.

The projections or tongues 21 and 22 are preferably staggered at opposite side edges of the strip elements 15 so that projections on one strip will confront the spaces or slots 20 between the projections of an adjacent strip element and enter such spaces or slots in the original stamped-out sheet A by which the spaces or slots are given initial form and place and whereby the adjoining projections of adjacent strips have their side edges in sliding contact when bent down to an intermeshed position.

While the projections may be of other geometrical forms the dovetail arrangement provides an interlocking system with lost-motion and limit stop features incident to the correlative divergent and convergent directions of the mutual side edge walls of the projections and slots into which they are secured.

The flat narrow strips may have a degree of inherent elasticity which will bias the facing to a flat planar condition.

Figure 7:
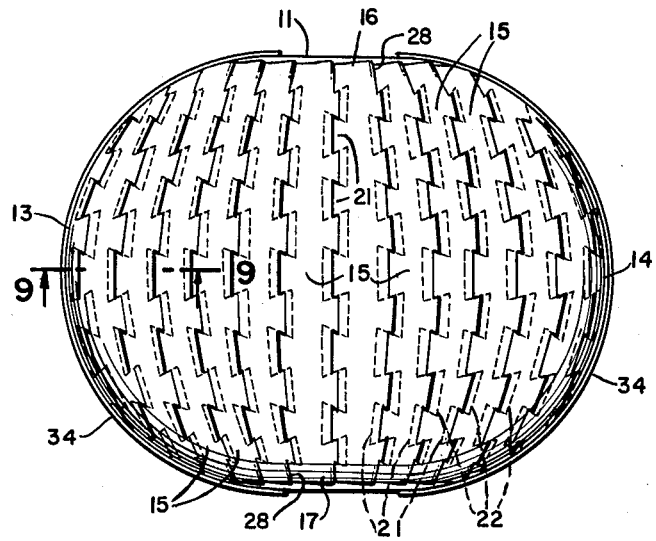
FIGURE 7 is a top plan view of the completed facing pulled out at the intermediate points of its side edges, or as having been pressed over the curved surface of the abrading tool.

In use of the device, it will be seen from FIGURE 7 if the side strips 13 and 14 are grasped in opposite hands and pulled apart, the facing or sheeting will undergo a change in geometrical form. This movement is accompanied by a separation of the strips, the strips being laterally spread in displacement which is greatest at the intermediate areas of the strip elements and proportionately diminished toward the end portions of the strips due to the restraint put upon the end portions by the crimps or folds 28. Due to this restraint the expansibility of the intermediate portion of the facing, as shown in FIGURES 7 and 8, causes the facing as a whole to progress from the flat planar form to a concavo-convex conformation which adapts itself to the curvature 12 of the abrading tool 10.

This spreading of the strips is regulated by the length of the projections, and also the degree of divergence of the side edges 24, 25 of the projections.

The facing or sheeting may be secured to the abrading tool 10 by an adhesive or by clamps indicated at 34 in FIGURE 8, or may be otherwise held to the curvilinear surface of the tool.

In grinding, in general, ophthalmic lens blanks are rough ground or generated to a desired curvature. This leaves abrasive marks from grinding compound or diamond marks from generator in the lens that has the desired curvature cut or ground on it. These abrasive or diamond marks must be next fined out so that the next step for the finish polishing of the lens can be undertaken. It is this fining with fine abrasive material on the lens tool that wears the tool and causes it to lose its desired curvature necessitating recutting the tool and also in time replacing the tool.

The present invention does away with having to true tools and replacing tools as the interlocking strips serve as a facing that absorbs the abrading action and relieves the tool body 11 and its surface 12 of the resultant distortion.

The interlocking strips of this invention may be used more than once but it will be understood that such interlocking metallic strips are inexpensive and because they are detachable and disposable will save hours of time in retruing or cutting on a lathe the surface of the abrading tool.

The invention permits the use of facings of metallic foil or sheet metal materials that are readily conformable to the curvatures of the tool without folds, creases or stretched areas.

The projections provide interlocks between adjacent strips and they also act as limit stops for restricting lateral spreading movement of the strips; for instance, to such excessive movement as would reveal separation of the edges of the strips or expose the surface 12 of the tool 10.

It will be seen particularly from FIGURES 1 and 7 that the projections or tongues are arranged in parallel lines laterally of the facing and that the tongues of adjacent lines project in relatively opposite directions. This arrangement constitutes a closely knit yet readily expansible construction and one in which the strips flex flatwise and shift laterally with respect to one another, all under the limits of the interlocking members.

The process of making the facing and assemblying it to the curvature of the tool involves the steps of producing in a substantially flat plane strip elements in a substantially parallel relationship with parts thereof underlapped, binding the end portions of the strips to restrict relative lateral movement of such end portions of the strip elements while permitting freedom of such lateral movement at intermediate portions of the strips in displacement which is greatest at such intermediate areas and proportionately diminishes toward the restrained end portions and expanding the facing by pulling upon one or both of its intermediate side edges which results in altering the shape of the facing from a flat planar form to a concavo-convex shape made to conform to the curvature of the tool; or by pressing the flat planar facing against the curved surface of the tool which will cause maximum expansion of the strips through the lateral central belt of the facing and diminishing spreading of the strips progressively toward the bound ends of the strips, thus causing the facing to conform accurately to the contour of the tool.

For clarity of understanding FIGURE 9 shows the facing in an initial application to the curved surface of the tool 10 to better appreciate the interleaving and intermeshing of the projections 21 and 22. In actual practice the facing will be pressed tightly against the tool surface and held thereto by suitable adhesive.

Although I have disclosed herein the best form of the invention known to me at this time, I reserve the right to all such modifications and changes as may come within the scope of the following claims.

What is claimed is:

1. A replaceable facing for curved abrading tools comprising
   (a) relatively laterally movable flexible strips in substantial parallelism,
   (b) intermeshing projections on the lateral edges of the strips underlapping adjacent strips, and
   (c) means for at least partially restraining end portions of the strips from relative lateral spreading apart movement.

2. A replaceable facing for curved abrading tools comprising
   (a) relatively laterally movable flexible strips in substantial parallelism,
   (b) edgewise abutting intermeshing projections on the lateral edges of the strips underlapping adjacent strips and crossing one another, and
   (c) means for at least partially restraining end portions of the strips from relative lateral spreading apart movement.

3. A replacable facing for curved abrading tools comprising
   (a) relatively laterally movable flexible strips in substantial parallelism,
   (b) dove-tail projections on the lateral edges of the strips underlapping adjacent strips with their side edges abutting forming limit stops for arresting relative lateral spreading movement of the strips to a point where gaps would occur in the facing, and
   (c) means for at least partially restraining end portions of the strips from relative lateral spreading apart movement.

4. A replaceable facing for curved abrading tools comprising
   (a) relatively laterally movable strips in substantial parallelism,
   (b) intermeshing projections on the lateral edges of the strips underlapping adjacent strips,
   (c) means for at least partially restraining end portions of the strips from relative lateral movement
   (d) so that on application of the facing to the curved surface of the abrading tool the strips will spread apart laterally in displacement which is greatest at the intermediate areas of the strips proportionally diminishing toward the restrained end portions of the strips causing the facing as a whole to assume a concavo-convex conformation adapting the facing to the curvature of the abrading tool.

5. A replaceable facing in initial flat planar form for curved abrading tools comprising
   (a) relatively laterally movable flexible strips in substantial parallelism,
   (b) intermeshing projections on the lateral edges of the strips underlapping adjacent strips,
   (c) means for at least partially restraining end portions of the strips from relative lateral movements
   (d) so that on application of the facing to the curved surface of the abrading tool the strips will spread apart laterally in displacement which is greatest at the intermediate areas of the strips proportionately diminishing toward the restrained end portions of the strips causing the facing as a whole to progress from the original flat planar form to a concavo-convex conformation adapting the facing to the curvature of the abrading tool while at the same time pulling out the projections in relatively opposite lateral directions to compensate for the lateral spreading apart of the strips so that the projections cover any gaps in the facing that might otherwise occur.

6. A replaceable facing for curved abrading tools as claimed in claim 5 in which the projections are of dovetail form for acting as limit stops delimiting the maximum lateral spreading of the strips to and including all intermediate areas of the strips.

7. A replaceable facing for curved abrading tools as claimed in claim 1 in which said means (c) comprises
   (d) bands of facing material connecting the end portions of the strips.

8. A replaceable facing for curved abrading tools as claimed in claim 2 in which said means (c) comprises
   (d) a band of facing material along and connected to the opposite end portions of the strips, said bands having
   (e) folds in the strips for causing the lateral approach of the bands to one another sufficient to result in the lapping of the projections.

9. A replaceable facing for curved abrading tools as claimed in claim 3 in which said means (c) comprises
   (d) a band of facing material integral with the strips connecting end portions thereof,
   (e) a second band of facing material integral with the strips connecting opposite end portions thereof,
   (f) folds in the bands to foreshorten the bands and causing lapping of the projections beneath the strips, and
   (g) means associated with the bands for substantially retaining the folds against opening movement.

10. The process for making a replaceable facing for curved abrading tools comprising
    (a) providing flexible strips in substantial parallelism with intermeshing projections on the lateral edges thereof,
    (b) moving the strips laterally toward one another while
    (c) underlapping the projections beneath adjacent strips, and
    (d) binding opposite end portions only of the strips for placing restraint against substantial lateral moving apart of the strips at end portions while permitting such lateral moving apart of the strips at intermediate areas of the strips.

11. The process for making replaceable facings for curved abrading tools comprising
    (a) providing flexible strips in substantial parallelism with intermeshing dovetail projections on the lateral edges thereof,
    (b) moving the strips laterally toward one another while
    (c) underlapping and crossing contiguous projections beneath adjacent strips while the strips are in the so moved positions, and
    (d) binding opposite end portions only of the strips for placing restraint against substantial lateral moving apart of the strips at end portions while permitting such lateral moving apart of the strips at intermediate areas of the strips within the limits permitted by the dovetail projections.

12. The process for making in initially substantially flat form replaceable facings for curved abrading tools comprising
   (a) incising a blank of flexible facing material to produce substantially parallel strips with intermeshing dovetail projections in edge to edge contact on the lateral edges of the strips and integral longitudinal bands connecting the strips at opposite end portions thereof,
   (b) making folds in the bands for moving the strips laterally toward one another while
   (c) underlapping the projections beneath adjacent strips, and
   (d) binding the folds against substantial opening for placing restraint against substantial lateral moving apart of the strips at end portions while permitting such lateral moving apart of the strips at intermediate areas of the strips within the limits permitted by the dovetail projections.

13. The process as claimed in claim 12 further comprising
   (e) applying the flat planar facing so made against the curved surface of the tool for laterally spreading apart the strips in displacement which is greatest at the intermediate areas of the strips proportionally diminishing toward the bound end portions of the strips to cause the facing as a whole to progress from the original flat planar form to a concavo-convex conformation adapting the facing to the curvature of the abrading tool.

References Cited in the file of this patent
UNITED STATES PATENTS

| | | |
|---|---|---|
| 369,431 | Brown | Sept. 6, 1887 |
| 1,082,202 | Krug | Dec. 23, 1913 |
| 1,216,488 | Pfeiffer | Feb. 20, 1917 |
| 1,491,383 | Dey | Apr. 22, 1924 |
| 2,024,303 | Obrig | Dec. 17, 1935 |
| 2,544,940 | Ritterbush et al. | Mar. 13, 1951 |
| 2,752,737 | Seifert | July 3, 1956 |
| 2,752,738 | Seifert | July 3, 1956 |
| 2,882,139 | Rock | Apr. 14, 1959 |
| 2,886,923 | La France | May 15, 1959 |
| 2,991,165 | Meyer et al. | July 4, 1961 |